United States Patent Office 2,872,240
Patented Feb. 3, 1959

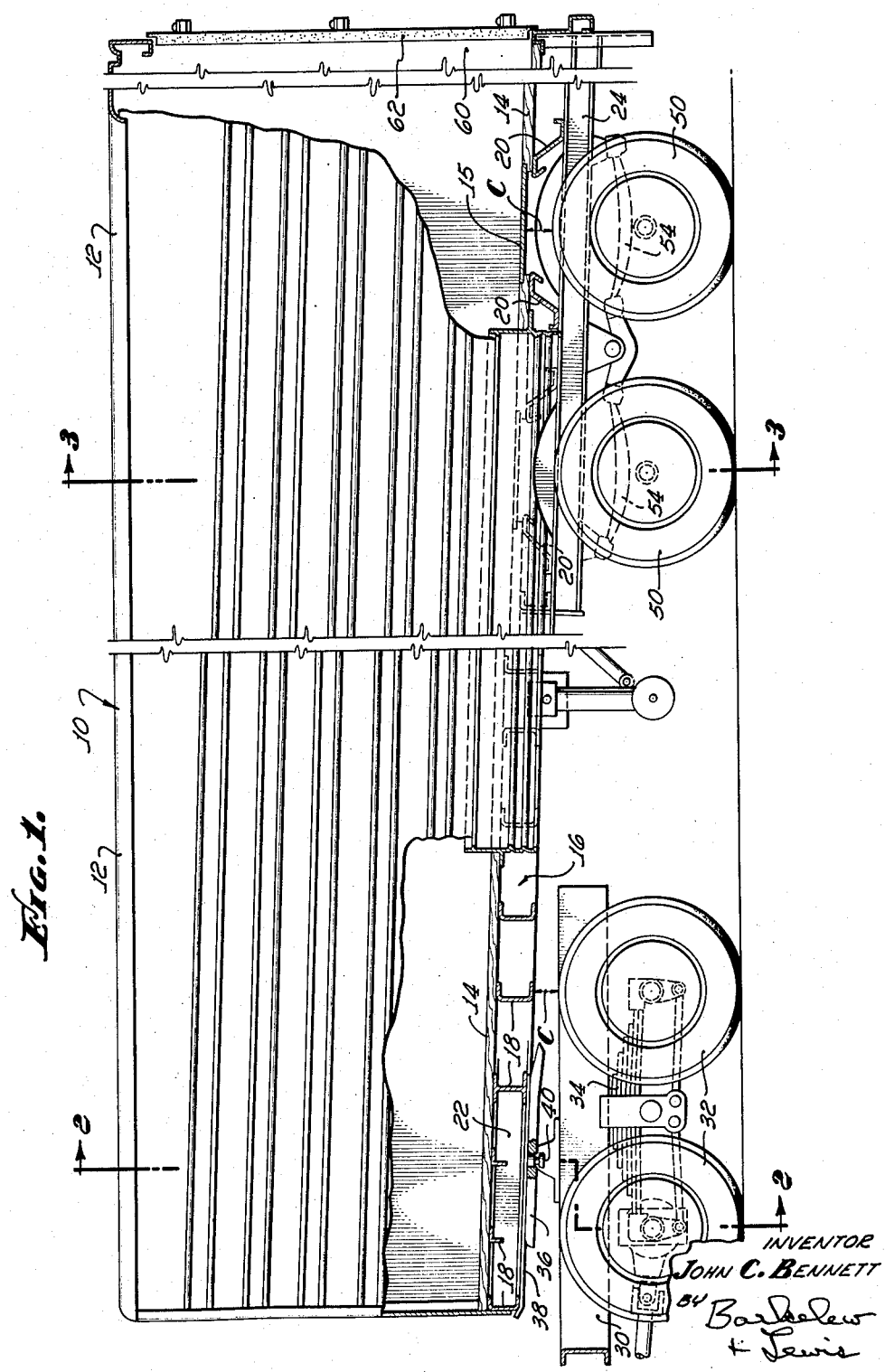

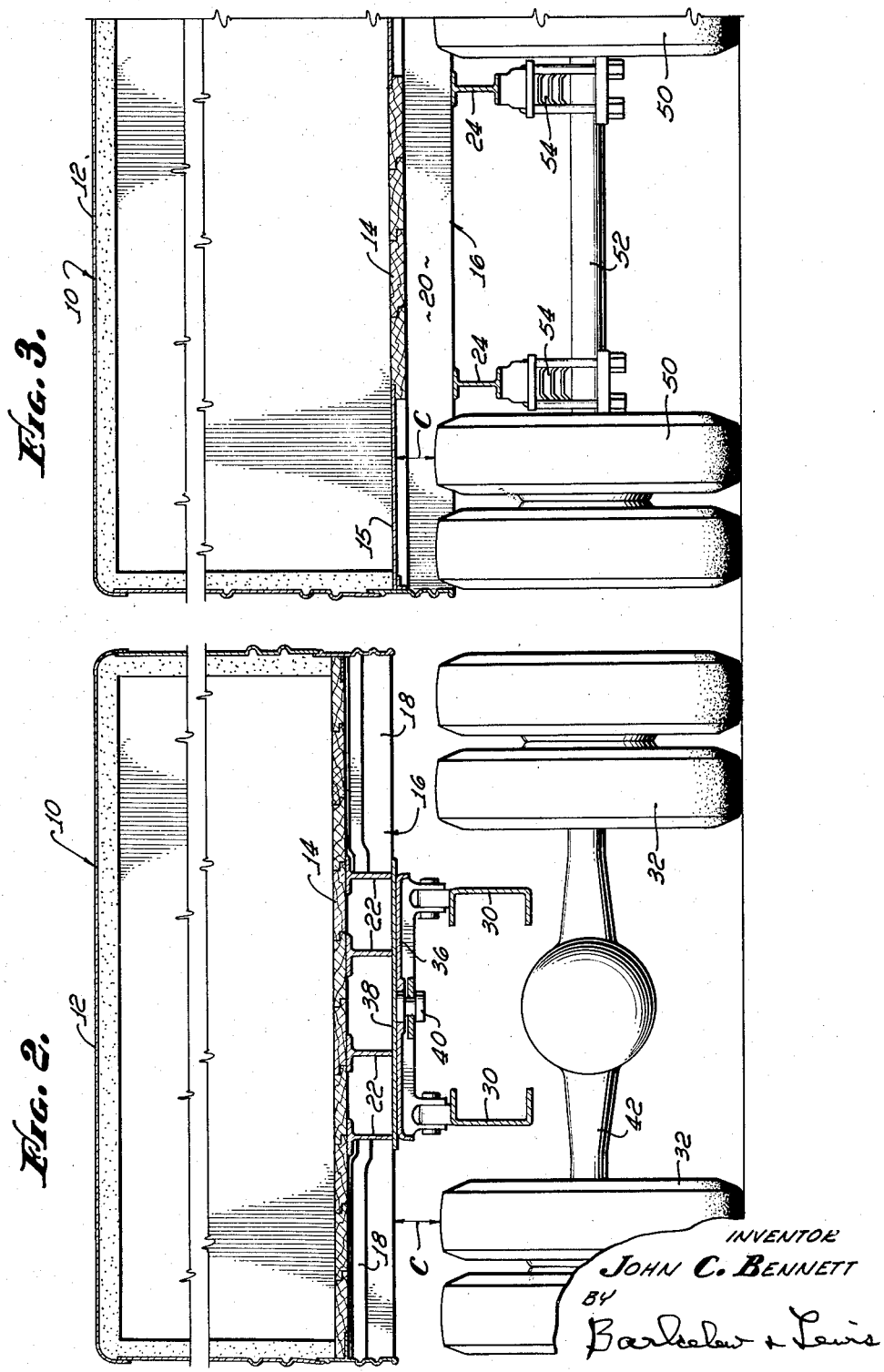

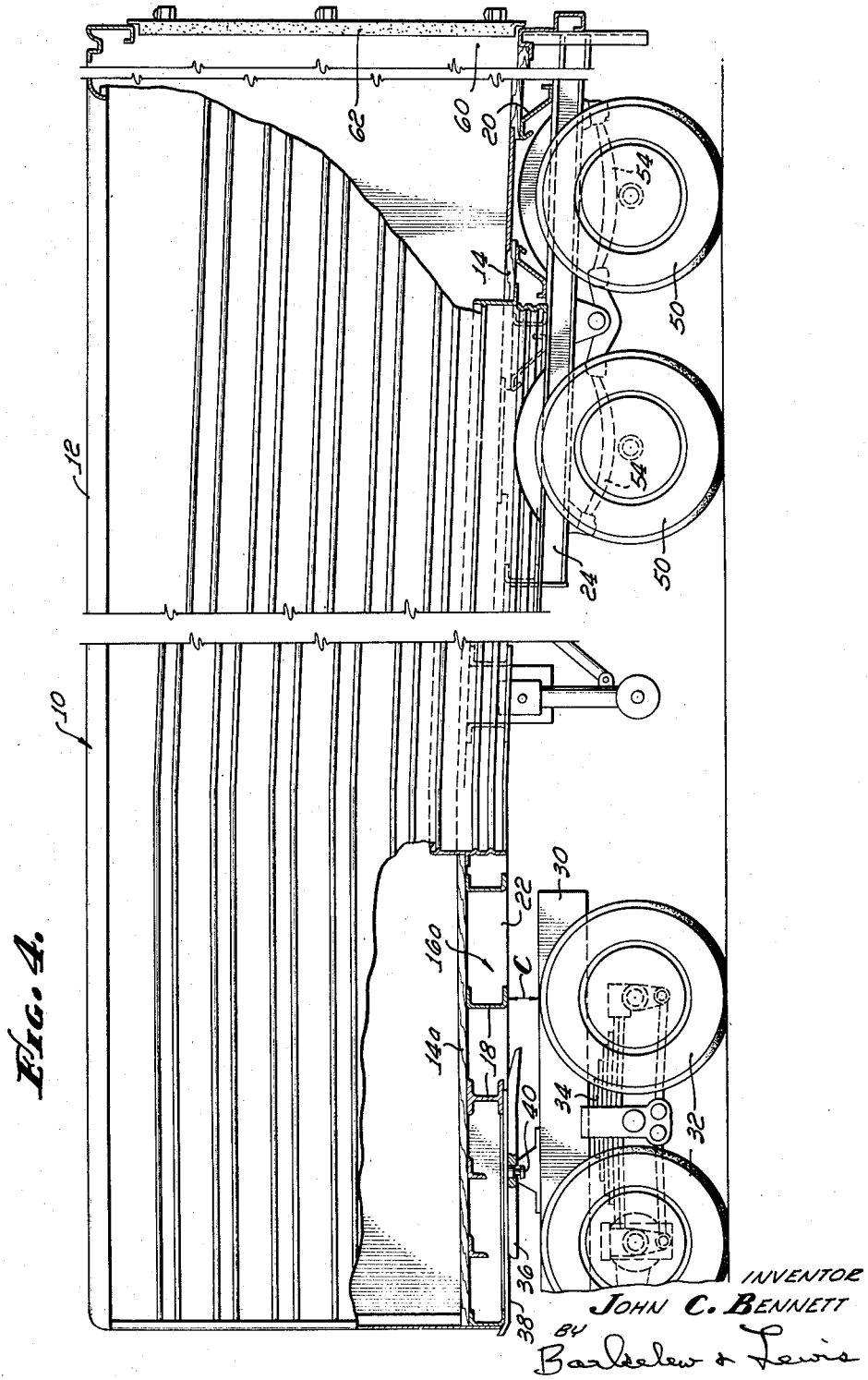

2,872,240

TRAILER VAN WITH SLOPING FLOOR

John C. Bennett, San Marino, Calif., assignor to Utility Trailer Manufacturing Company, Los Angeles, Calif., a corporation of California Application December 2, 1957, Serial No. 699,976

4 Claims. (Cl. 296—28)

This invention relates to trailers of the van type, either of the semi-trailer or full trailer type. The general object of the invention is to provide increased cubic capacity of trailer vans along with certain other advantages as will appear. Maximum dimensions in length, width and height of trailer vans are commonly legally prescribed. Within those limitations it is obviously desirable to have maximum volumetric carrying capacity.

In any trailer of the type with which this invention is concerned, the front wheels (whether they be the front wheels of a full-type trailer or the rear wheels of a towing vehicle which are in full effect the front wheels of the trailer) must have, unloaded, a full load clearance under the lowest parts of the trailer under-frame (e. g. its longitudinal beams) in order to be dirigible. That means that the floor surface height above the pavement must be equal to the wheel diameter, plus the full load clearance of the wheels under the under-frame (including the clearance necessitated by relative angular movement in the vertical longitudinal plane due to humps and dips in the road-way), plus the floor thickness.

On the other hand, the non-dirigible rear wheels may be so located with reference to the under-frame spacings that they need only the full load clearance under the floor or a floor plate. The necessary height of the floor surface above the pavement over the rear wheels needs then only to be equal to the wheel diameter, plus the clearance, plus the floor or plate thickness.

In conventional trailers, a horizontal floor extends for its full length at the front-end height, with excessive clearance over the rear wheels. A two-level floor has been proposed and used, with the front part of the floor at the necessary front-end height, and the remainder of the floor at the lower height allowable over the rear wheels; both parts of the floor being horizontal, with a step between them. Under a horizontal roof of any set height, such a floor arrangement gives increased cubic capacity, but it has the serious disadvantage of presenting a floor step over which goods must be lifted. And where the goods are heavy that involves introducing lifting apparatus or machinery to the trailer interior, and in some instances that machinery can only be introduced after a large, heavy, bulky piece of goods has been first placed on the lower floor level.

The present invention provides for increased cubic capacity under a horizontal roof of set height, and does so without presenting the troublesome floor step. It does that by providing characteristically a floor sloping at preferably uniform slope from front to back, up which floor goods may be easily moved manually or without special lifting machinery. And further, as will appear the sloping floor allows for a materially larger door opening at the rear, facilitating loading and unloading.

Illustrative embodiments of the invention as applied, illustratively, to a semi-trailer, are shown in the accompanying drawings, in which:

Fig. 1 is a longitudinal elevation with parts in section showing one illustrative form of the invention;

Figs. 2 and 3 are cross-sections on lines 2—2 and 3—3 of Fig. 1; and

Fig. 4 is a view similar to Fig. 1, showing a modification.

The drawings show a trailer with a van-type body 10 with horizontal roof 12 and, in Fig. 1, a floor 14 and under-frame structure 16 that slope uniformly from front end to rear end. The under-frame structure is typically made up of transverse beam members such as shown at 18, and 20, and such longitudinals as 22 at the front over the front axles and 24 over the rear axles. In some trailer structures the longitudinals extend through the whole length of the under-framing. Here the longitudinals are shown as only over the axles for weight transmission to them. In this particular design a skin-stressed body provides the longitudinal stiffness between the areas of support.

The drawings show the rear end 30 of a towing vehicle frame supported on rear wheels 32 sprung to the frame at 34. The towing vehicle frame is shown as carrying its usual element 36 of the fifth wheel whose other element 38 is carried on the under side of the trailer under-framing. The king-pin shown at 40 provides the vertical axis about which the wheel and axle unit 32—42 turn under the trailer under-frame. As is apparent the clearance, designated C, between the wheels and the under-framing must provide the full load clearance in order that the dirigible wheels may swing around under the under-framing. When the front end of the semi-trailer is mounted on the towing vehicle wheels 32 become in full effect the front wheels of the trailer and function in the same manner as the front dirigible wheels of a full trailer with the wheels in the same position relative to the trailer framing as here shown. In both cases the front dirigible wheels have to have the full load clearance under the trailer framing.

The rear wheel and axle unit 50—52 of the trailer is here shown as sprung, at 54, under the longitudinals 24 which bear upwardly against transverse frame members 18 and 20. Seeing that this wheel and axle unit is not dirigible with reference to the trailer frame, its wheels only need full load clearance (indicated C) under floor 14 or preferably under the thin floor plates 15 set in the floor. It will be noted that transverse frame members 20 are so spaced as to form wells between them to receive the upper portions of the wheels, and that longitudinals are so placed between the wheels that no part of the framing interferes with the wheels maving up to the minimum allowable clearance distance under the floor or floor plate.

Due to these considerations the height of the trailer floor at the point above the rearmost wheels may be less than its height above the front wheels by an amount at least equal to the vertical dimension of the under-framing, or that plus the difference in thickness of the floor and thin floor plates. In a typical trailer van forty feet long that difference in floor height over the front and rear wheels is about seven inches. The fore and aft floor slope in that typical trailer is then (with the usual wheel unit spacing) about ten inches in forty feet. Such a slope does not interfere materially with manual movement of goods forwardly over the trailer floor; but at the same time it is helpful to a one-man driving crew who may have to unload at destinations.

The rear overhang of a typical trailer body behind the rearmost wheels may be as much as nine feet. With the floor sloping continuously to its rear end at 60, that rear loading end is lower above the pavement than the rear end of a horizontal floor having the same clearance over the rear wheels. In the typical figures given the difference is about two inches. And, what is equally important, that floor slope increases the height of the rear end opening of door 62 by the same amount. Both those factors materially facilitate loading and unloading.

Fig. 4 shows a modification where the forward portion 14a of the floor and 16a of the under-framing are horizontal over the forward wheel and axle unit, with the same clearance C over the wheels as in Fig. 1. The rearward parts of the floor 14 and framing 16 then slope rearwardly from that horizontal portion as before described. Other than that the arrangement and the parts are the same as in Fig. 1 and are given the same numerals. The advantages are the same as described for Fig. 1, plus the advantage of having a horizontal floor portion for carriage of goods best carried on a horizontal floor.

The drawings show the trailer in its unloaded position on the running gear. The term "full load clearance," as used herein, means the clearance necessary to adequately clear the trailer above the wheels when under full load.

I claim:

1. In trailers and the like of the van type, the combination including a body with side walls, a front end wall and a horizontal roof, a floor structure, a rear door opening extending from under the roof to the floor, an under-framing under the floor structure, running gear comprising a forward dirigible wheel and axle unit located under the forward portion of the under-framing and sprung thereto and a non-dirigible rear wheel and axle unit located under the rear portion of the under-framing and sprung thereto, the floor structure and under-framing overhanging the rear wheel and axle unit to the rear thereof, the under-framing above the wheels of the rear wheel and axle unit being arranged to form wells above the wheels to allow relative upward movement of the wheels to levels above the bottom level of the under-framing, the under-framing being vertically spaced above the wheels of the forward wheel and axle unit by a pre-determined clearance and the floor structure being vertically spaced above the wheels of the rear wheel and axle unit by substantially the same spacing, and the floor structure and underframing sloping downwardly at substantially uniform slope from a point approximate the forward wheel and axle unit to their rear ends, so that the rear end of the floor is lower than is the portion of the floor over the rear wheel and axle unit.

2. The combination defined in claim 1, in which the floor structure has a pre-determined vertical thickness throughout its major portion, and in which said structure includes floor portions over the wheels of the rear wheel and axle unit having vertical thickness less than the first mentioned vertical thickness, said floor portions having their upper surfaces substantially co-planar with the upper surface of the major portion of the floor structure, and in which said rear unit wheels are vertically spaced under said floor portions by substantially said same spacing.

3. The combination defined in claim 2 and in which the floor structure and under-framing slope at substantially uniform slope from their forward to their rear ends.

4. The combination defined in claim 1 and in which the floor structure and under-framing slope at substantially uniform slope from their forward to their rear ends.

References Cited in the file of this patent

UNITED STATES PATENTS

| 1,922,027 | Carter | Aug. 15, 1953 |
| 2,812,192 | Cole | Nov. 5, 1957 |